May 9, 1939.    J. P. BURKE    2,158,028
SPRING
Filed July 12, 1937
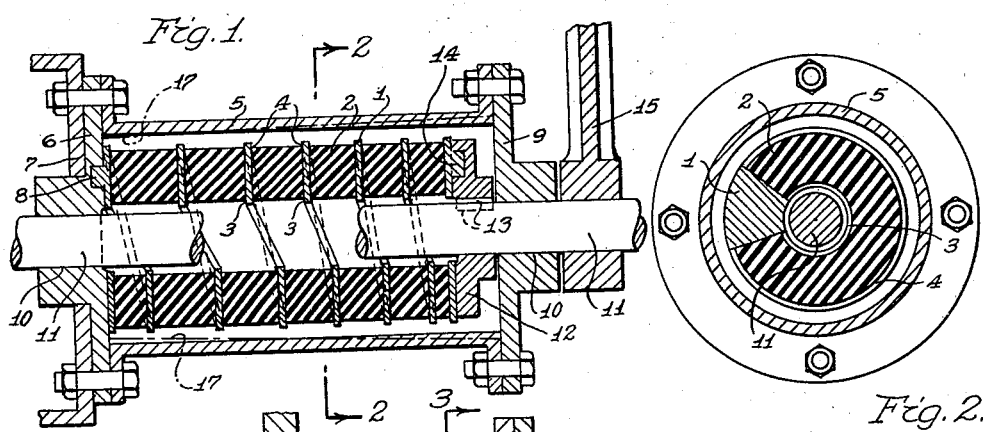
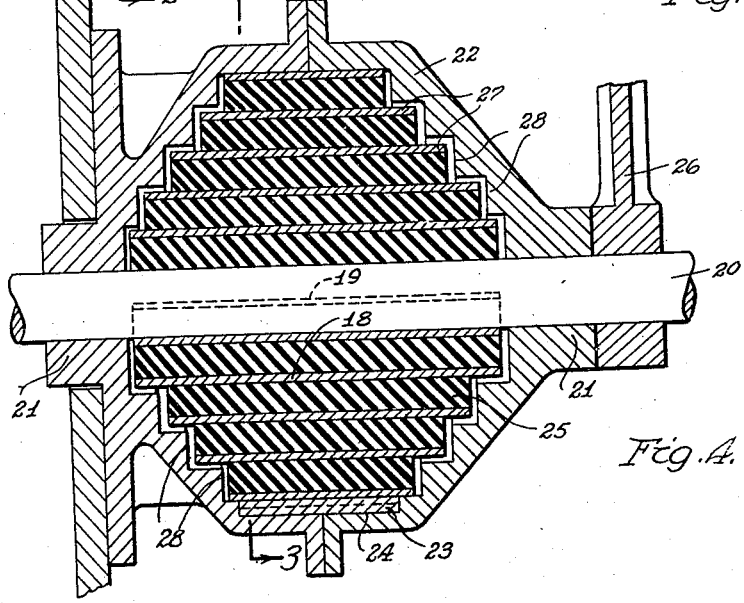
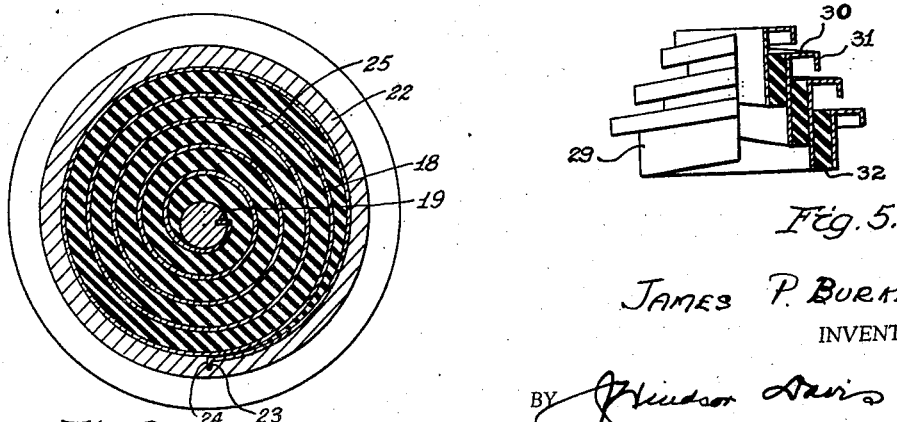
JAMES P. BURKE
INVENTOR.
BY *J. Hudson Davis*
ATTORNEY.

Patented May 9, 1939

2,158,028

UNITED STATES PATENT OFFICE 2,158,028

SPRING

James P. Burke, Knoxville, Tenn.

Application July 12, 1937, Serial No. 153,206

11 Claims. (Cl. 267—33)

This invention relates to springs of the type suitable for a variety of uses such as for vehicle suspensions, power plant suspensions, flexible couplings and the like and has for its object to provide a spring composed of metal and an elastic material so combined as to give advantageous springing characteristics of each type of material and so arranged as to be capable of adaptation to any reasonable predetermined load deflection curve.

Another object is to provide a spring which is stable against tilting of its axis and flexible to a predetermined degree in a direction circumscribing its axis.

More particularly it is an object of the invention to provide a spring comprising a metallic spiral or volute with the coils thereof separated by elastic material preferably surface bonded thereto, the volume of elastic material varying to permit of a varying spring rate.

Another object is to provide a spring composed of inter-laid spirals or volutes of rubber and metal adapted to operate in a direction of rotation about the spring axis to store energy therein, the rubber being subjected largely to torsional stresses, in combination with a stop means against which the metallic member progressively contacts whereby the maximum stresses to which any part of the spring can be subjected are pre-determined and whereby the load deflection ratio of the spring may be made to increase with increasing loads in a manner determined by the shape and position of the stop means.

Other objects and advantages will hereinafter become more apparent as reference is had to the accompanying drawing wherein:

Fig. 1 is a longitudinal diametric section through my improved spring,

Fig. 2 is a transverse diametric section taken along the line 2—2 of Fig. 1.

Fig. 3 is a view similar to Fig. 1 of a modified form of the spring, and

Fig. 4 is a transverse diametric section taken along the line 4—4 of Fig. 3.

Fig. 5 is a quarter section of another modification.

More particularly, 1 indicates a flat spiral metallic spring, the spacing between the turns of which increase from right to left in Fig. 1. Between the turns is interposed a spiral 2 of elastic material such as rubber, the transverse thickness of which is slightly less than that of the metal turns so that the metal extends slightly beyond the rubber both internally as indicated at 3 and externally as indicated at 4. The rubber 2 is preferably surface-bonded to the spiral 1 throughout the entire length of both surfaces which contact the spiral.

Surrounding the spring 1, 2 is a cylindrical casing 5 of greater diameter than the spring when the spring is in normally unloaded position, as illustrated. The casing 5 is bolted or otherwise secured to an end plate 6 which is intended to be fixedly secured to a support 7. One end of the spiral 1 is anchored, as indicated at 8, to the end plate 6. An end plate 9 is bolted or otherwise secured to the other end of the casing 5 and this plate may be attached, if desired, to the support 7 although, for many uses it may be left unsupported according to the illustration. The plates 6 and 9 each have bearing portions 10 axially of the casing 5 for the reception of a relatively rotatable shaft 11 which is attached to the other end of the spiral 1 by means of a plate 12 to which it is keyed at 13, the spiral being anchored to this plate at 14. An arm 15 serves as a lever by which the shaft 11 may be rotated to load and unload the spring.

In operation, if the shaft 11 is rotated away from the reader the turns of the spiral 1 jointly with the rubber 2 will increase in diameter. If the metal of the spiral is of uniform cross-sectional area and tensile strength and if the rubber has a uniform modulus of elasticity that part of the spring containing the least amount of metal and the greatest volume of rubber will expand fastest. Since the anchorage 8 is fixed the part to first contact the casing 5 will be in the vicinity indicated by the numeral 16. Continued rotation of the shaft 15 will cause continuously and gradually increasing contact of the periphery of the spiral, the action being to "unwind" the spiral by bending the metal against its longer cross-sectional thickness and to impose tension on the rubber in the direction of its length accompanied by an amount of transverse shear due to the fact that the coils expand progressively and not in unison. The advantage of the fixed anchorage 8 is that the total spring will function under light loading, that is, until the spiral begins its contact with the casing, and thereafter as the contact increased the spring will gradually increase its load deflection ratio, becoming very stiff to preclude actual bottoming.

If the arm 15 is released so that the spring is allowed to return to normal and the arm 15 then swung toward the reader the spiral tends to "wind up" or progressively contract, against the shaft 11, that portion which formerly first contacted the casing 5 now being first to contact the shaft.

The design is subject to numerous modifications to accommodate the spring to a particular use or a particular load deflection curve. Thus, the spacing of the turns may be made uniform, or otherwise varied; the rubber may change progressively, or at intervals, as to its modulus of elasticity and the casing 5, while described as being cylindrical in preferred form may have some other suitable internal shape as for instance that of a frusto cone as indicated by the dotted line 17 and the outside or inside diameter of the turns of the spiral need not necessarily be uniform.

In Figures 3 and 4 the spring is illustrated as being of volute shape. The metallic volute 18 is anchored at one end 19 in a load imposing shaft 20 which is rotatably mounted in bearings 21 of a casing 22 which is the load receiving member, the other end of the volute 18 being anchored to the casing at 23 as by fitting into a groove 24 provided for the purpose. The volute 18 preferably varies in width progressively outwardly and between the coils thereof is interposed a continuous layer 25 of elastic material, such as rubber, which is preferably surface-bonded at both contacting surfaces to the adjacent coils. Secured to one or both exposed ends of the shaft 20 is a lever arm 26.

Due to the tapering shape of the volute 18 the outer or edge portions 27 thereof are covered by rubber only on the inside. The inside of the casing 22 is formed at 28 somewhat, but not exactly, in counterpart of the shape of the outside of these exposed portions 27. The casing formations are larger to provide initial clearance.

In operation, if the arm 26 is rotated away from the reader the volute tends to unwind, the coils increasing in diameter thereby imposing tension stresses in the rubber 25. The matter of whether or not all of the surfaces 27 contact the portions 28 throughout their length simultaneously, or whether the contact is progressively inwardly or progressively outwardly depends upon the amount of taper of the metallic volute. In preferred form it is, as illustrated, proportioned to obtain contact progressively outwardly in order to obtain a spring rate or load deflection curve of progressively increasing stiffness under increasing loads.

In Fig. 5 a spiralled volute 29 of metal is formed with outturned flange portions 30 which are turned downwardly at the outer edge 31. Interposed between the coils of the volute 29 is a layer of elastic material 32 surface bonded on each side to the volute. The flange 30 is of sufficient width to span the elastic layer. When a load is imposed axially of the volute the elastic layer is subjected to shear. Due to the fact that the shear areas become progressively smaller toward the inside of the spiral and due to the fact that the stiffness of the spiral does not, in my design, increase to a compensating extent, the innermost turn will deflect faster than the remaining turns. The uppermost part of the step 31 will therefore contact the flange 30 therebelow first and the amount of contact will gradually increase with decreasing loads. The load deflection ratio increases as the amount of spring employed decreases.

Various modifications will suggest themselves to those skilled in the art and I, therefore, desire to be extended protection within the scope of the appended claims.

What I claim is:

1. A spring comprising a wound metal spring having a plurality of turns, elastic material separating said turns, and stop means separated from said spring against which said metal spring contacts progressively and over a continuously increasing length during continuing deflection of the spring.

2. A spring comprising a metallic spiral spring and elastic material between the coils of said spiral spring and surface-bonded thereto, and stop means separated from said spring and against which said spiral spring progressively contacts during continuing deflection of the spring.

3. A spring comprising a metallic spiral spring and elastic material between the coils of said spiral spring and surface-bonded thereto, and stop means concentric with said spiral spring constituting means for limiting the amount of deflection thereof, said stop means serving also as a housing for said spring.

4. A spring comprising a metallic spiral spring and elastic material between the coils of said spiral spring and surface-bonded thereto, and a cylindrical casing constituting a housing for said spring and also a stop means for progressively precluding a continuously increasing portion of said spring from further deflection under increasing loading.

5. A spring comprising a metallic spiral spring and elastic material between the coils of said spiral spring and surface-bonded thereto, and a casing about said spring having a frusto-conical internal shape constituting means for progressively precluding a continuously increasing amount of said spiral spring from further deflection under increasing loading.

6. The combination of a coil spring, a load receiving member to which one end of said spring is anchored, a shaft extending axially of said spring to which the other end of said spring is anchored, a load imposing member which, upon actuation, expands or contracts said spring diametrically, and stop means concentric with the axis of said coil individually limiting the amount of the expansion or contraction of each turn of said coil.

7. The combination of a coil spring made of a metallic ribbon, a strip of elastic material between all adjacent turns of said coil and surface bonded thereto at each side thereof, a housing for said spring to which one end of said spring is anchored, a shaft extending axially of said spring to which the other end of said spring is anchored, and means for relatively rotating said shaft and said casing thereby expanding said coil spring into progressive contact with said casing.

8. The combination of a spring comprising a metallic spiral spring and a strip of elastic material surface bonded thereto, and stop means against which said spiral spring progressively contacts during deflection thereof under loading, said means serving also as a housing for said spring.

9. The combination of a spring comprising a volute made of flat metal and having rubber interposed between the coils thereof, the outer edges of said volute comprising a non-planar spiral, and stop means also in the form of a spiral against which said volute progressively contacts during deflection of said spring.

10. The combination of a spring comprising a metallic volute having cross-sections which gradually decrease in area radially outwardly and a volute of elastic material interposed between the turns of said metallic volute, the edges of said metallic volute being exposed and constituting oppositely inclined spirals, and a casing for said spring to the encircling wall of which the outer end of said metallic spiral is anchored, the end walls of said casing each having an internal spiral shape, similar to the exposed edges of said metallic spiral, and load imposing means axially of said metallic spiral, said load imposing means upon actuation in one direction unwinding said metallic spiral thereby causing said exposed edges to gradually contact the spiral formations of said casing.

11. The combination of a spring comprising a metallic volute having cross-sections which gradually decrease in area radially outwardly and a volute of elastic material interposed between the turns of said metallic volute, the edges of said metallic volute being exposed and constituting oppositely inclined spirals, and a casing for said spring to the encircling wall of which the outer end of said metallic spiral is anchored, the end walls of said casing each having an internal spiral shape similar to the exposed edges of said metallic spiral, and load imposing means axially of said metallic spiral, said load imposing means upon actuation in one direction unwinding said metallic spiral thereby causing said exposed edges to gradually contact the spiral formations of said casing, said load imposing means upon actuation in the opposite direction contacting the coils of said metallic volute thereby imposing compression on said elastic material.

JAMES P. BURKE.